United States Patent
Rathi et al.

(10) Patent No.: US 7,568,107 B1
(45) Date of Patent: Jul. 28, 2009

(54) METHOD AND SYSTEM FOR AUTO DISCOVERY OF AUTHENTICATOR FOR NETWORK LOGIN

(75) Inventors: Manish Rathi, San Jose, CA (US); Rajesh Sharma, Santa Clara, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 689 days.

(21) Appl. No.: 10/645,459

(22) Filed: Aug. 20, 2003

(51) Int. Cl.
*G06F 21/00* (2006.01)
*G06F 7/04* (2006.01)
*H04N 7/167* (2006.01)

(52) U.S. Cl. .................. 713/182; 726/26; 725/31
(58) Field of Classification Search .................. 713/182; 726/26; 725/31
See application file for complete search history.

(56) References Cited

U.S. PATENT DOCUMENTS

| | | | | |
|---|---|---|---|---|
| 5,544,322 A * | 8/1996 | Cheng et al. | ................ | 709/229 |
| 5,586,260 A * | 12/1996 | Hu | ................ | 726/12 |
| 5,764,887 A * | 6/1998 | Kells et al. | ................ | 726/14 |
| 5,805,801 A | 9/1998 | Holloway et al. | | |
| 6,021,495 A * | 2/2000 | Jain et al. | ................ | 726/16 |
| 6,085,238 A | 7/2000 | Yuasa et al. | | |
| 6,205,147 B1 | 3/2001 | Mayo et al. | | |
| 6,298,383 B1 * | 10/2001 | Gutman et al. | ................ | 709/229 |
| 6,393,484 B1 * | 5/2002 | Massarani | ................ | 709/227 |
| 6,418,466 B1 * | 7/2002 | Bertram et al. | ................ | 709/221 |
| 6,539,431 B1 * | 3/2003 | Sitaraman et al. | ................ | 709/226 |
| 6,657,956 B1 * | 12/2003 | Sigaud | ................ | 370/230 |
| 6,704,873 B1 * | 3/2004 | Underwood | ................ | 726/12 |
| 6,912,637 B1 | 6/2005 | Herbst | | |
| 6,954,790 B2 | 10/2005 | Forslow | | |
| 6,957,199 B1 * | 10/2005 | Fisher | ................ | 705/78 |
| 7,024,478 B1 * | 4/2006 | Dalgic et al. | ................ | 709/225 |
| 7,036,143 B1 * | 4/2006 | Leung et al. | ................ | 726/15 |
| 7,039,037 B2 * | 5/2006 | Wang et al. | ................ | 370/349 |
| 7,124,189 B2 * | 10/2006 | Summers et al. | ................ | 709/227 |
| 7,127,524 B1 * | 10/2006 | Renda et al. | ................ | 709/245 |
| 7,143,435 B1 * | 11/2006 | Droms et al. | ................ | 726/3 |
| 7,149,219 B2 * | 12/2006 | Donahue | ................ | 370/392 |
| 7,171,555 B1 * | 1/2007 | Salowey et al. | ................ | 713/156 |
| 7,197,556 B1 | 3/2007 | Short et al. | | |
| 7,216,173 B2 * | 5/2007 | Clayton et al. | ................ | 709/227 |
| 7,389,534 B1 * | 6/2008 | He | ................ | 726/15 |

(Continued)

OTHER PUBLICATIONS

Office Action from U.S. Appl. No. 09/895,144 mailed Sep. 8, 2004, 14 pgs.

(Continued)

*Primary Examiner*—Emmanuel L Moise
*Assistant Examiner*—Techane J Gergiso
(74) *Attorney, Agent, or Firm*—Blakely Sokoloff Taylor & Zafman LLP

(57) ABSTRACT

A method and system for auto discovery of authenticator for network login is described. The system includes an authenticator discovery controller of a packet forwarding device that helps a user discover the IP address of the packet forwarding device and directs the user to a network login page. The method includes intercepting a request for a web page from a user who is connected to a packet forwarding device that prevents the user from accessing a network, directing the user to a network login page, authenticating the user, and allowing the user to access the network when the user is authenticated.

14 Claims, 8 Drawing Sheets

U.S. PATENT DOCUMENTS

| | | | |
|---|---|---|---|
| 2002/0049655 A1* | 4/2002 | Bennett et al. | 705/35 |
| 2002/0095573 A1* | 7/2002 | O'Brien | 713/168 |
| 2002/0144144 A1* | 10/2002 | Weiss et al. | 713/201 |
| 2003/0035409 A1* | 2/2003 | Wang et al. | 370/349 |
| 2003/0041136 A1* | 2/2003 | Cheline et al. | 709/223 |
| 2003/0115480 A1* | 6/2003 | McDysan | 713/201 |
| 2003/0140131 A1* | 7/2003 | Chandrashekhar et al. | 709/223 |
| 2003/0147403 A1* | 8/2003 | Border et al. | 370/395.53 |
| 2004/0006708 A1* | 1/2004 | Mukherjee et al. | 713/201 |
| 2004/0015728 A1* | 1/2004 | Cole et al. | 713/201 |
| 2004/0030890 A1* | 2/2004 | Chu et al. | 713/161 |
| 2004/0034797 A1* | 2/2004 | Becker Hof | 713/201 |
| 2004/0064604 A1* | 4/2004 | Cox | 710/36 |
| 2004/0103275 A1* | 5/2004 | Ji et al. | 713/150 |
| 2004/0117653 A1* | 6/2004 | Shapira et al. | 713/201 |
| 2004/0193513 A1* | 9/2004 | Pruss et al. | 705/30 |
| 2004/0230841 A1* | 11/2004 | Savini | 713/202 |
| 2004/0255154 A1* | 12/2004 | Kwan et al. | 713/201 |

OTHER PUBLICATIONS

Final Office Action from U.S. Appl. No. 09/895,144 mailed May 6, 2005, 13 pgs.

Office Action from U.S. Appl. No. 09/895,144 mailed Oct. 20, 2005, 8 pgs.

Final Office Action from U.S. Appl. No. 09/895,144 mailed Apr. 7, 2006, 10 pgs.

Office Action from U.S. Appl. No. 09/895,144 mailed Jan. 22, 2007, 9 pgs.

Final Office Action from U.S. Appl. No. 09/895,144 mailed Jun. 5, 2007, 11 pgs.

Office Action from U.S. Appl. No. 09/895,144 mailed Nov. 14, 2007, 13 pgs.

Cisco Systems, Inc., "Controlling Access to the Switch Using Authentication," http://www.cisco.com/univercd/cc/td/doc/product/lan/cat5000/rel_5_2/config/authent.html Oct. 1, 1999, 36 pgs.

Network World Fusion, "Circuit extensions assist Ethernet over ATM," http://www.nwfusion.com/news/tech/2002/1014techupdate.html Oct. 14, 2002, 3 pgs.

Final Office Action from U.S. Appl. No. 09/895,144 mailed May 22, 2008, 13 pgs., \* cited by examiner

METHOD AND SYSTEM FOR AUTO DISCOVERY OF AUTHENTICATOR FOR NETWORK LOGIN

BACKGROUND

1. Technical Field

Embodiments of the invention relate to the field of network security, and more specifically to auto discovery of an authenticator for web-based network login.

2. Copyright Notice/Permission

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Extreme Networks, Inc., All Rights Reserved.

3. Background Information and Description of Related Art

In recent history, the architecture of computer network topologies has changed dramatically. In the past, computer networks were mainly private networks contained within a private office. Now, however, an entire building with multiple offices of different companies may make up a single local area network (LAN), a user may use a laptop to access a wireless LAN in a public place, or a student may plug a laptop into network ports in various classrooms. Situations like these open a network to potential cyber-attacks that may compromise the security of network resources and also prevent access by legitimate users. As a consequence, network resource providers are under enormous pressure to provide bulletproof security and foolproof access control, so that no matter what type of method a user uses to access the network, whether it be via a modem, network interface card (NIC), or by some other means, private information and network resources remain secure. Security mechanisms in the devices at the network edge, such as LAN switches, are particularly critical because they grant access to the rest of the network.

The difficulties associated with securing a network have existed ever since computer networks were first introduced. Over the years a variety of techniques have been employed to provide network security. Generally most of these security techniques take place between network nodes (a node is an end point for data transmissions, such as a computer workstation, network server, CD-ROM jukebox, or some other such device) and not between connection points (a connection point is an intermediate point in the network, such as a router, hub, or a switch). Some of those methods include encryption techniques to prevent unauthorized access to a network resource, such as a network server or network printer. For example, techniques like private key and public key encryption codes transmit encrypted data between individual machines.

A common network security technique is the login procedure, which occurs when a network node attaches to a network resource, such as when a user logs into a server. Typically, the user is prompted for authentication information, such as a username and password or an identification card. Once the user inputs the authentication information, an authentication system compares the user's input to user authentication and authorization information stored in a database. If the user's input is valid, the user is granted access to certain administrator-defined network resources.

An example of an authentication system employed in login procedures is the Novell Directory Services database or the Remote Authentication Dial-In User Service (RADIUS). The RADIUS service is actually a protocol for carrying authentication, authorization, and configuration information between an access server and an authentication server. The RADIUS protocol has been documented as an Internet standard protocol, the most recent version of which is Request For Comment (RFC) 2865, Rigney, C., Willens, Rubens, A., Simpson, W., *RADIUS*, June 2000.

A login procedure using the RADIUS protocol secures networks against unauthorized access using a centralized authentication server ("the RADIUS server") in communication with an access server ("the RADIUS client") using the RADIUS protocols. All of the user information necessary for authenticating users seeking access to the network and various network services resides on the RADIUS server. A network access server operates as a RADIUS client by sending authentication requests to the RADIUS server using the client protocols. In response the RADIUS server either accepts, rejects, or challenges the authentication request, and the RADIUS client acts on that response to permit or deny access to the network and various network services, or to request more information from the user.

A drawback to prior art login procedures is that a user who plugs a computer into a network port has immediate access to the network, although they may not necessarily have access to any of the resources on the network (i.e. they have not yet successfully completed the login procedure).

Other prior art network security techniques have been implemented at a connection point (i.e. at the LAN switch level) to prevent intruder and hacker attacks. For example, algorithms and techniques have been designed and implemented in LAN switches to prohibit cyber-attacks, such as access control lists (ACLs), Denial of Service (DoS) attack protection as documented in Request for Comments (RFC) 2267, *Network Ingress Filtering: Defeating Denial of Service Attacks which employ IP Source Address Spoofing*, January 1998, and Synchronize (SYN) attack protection.

For example, access lists were developed to combat cyber-attacks on the LAN switch by providing an administrator-controlled list of Internet Protocol (IP) addresses or media access control (MAC) addresses that were authorized to access the network. DoS and SYN attack protections are based on similar concepts. For example, when a hacker overloads a targeted connection point such as a router or a LAN switch with incoming data packets, the router or LAN switch is prevented from accepting new legitimate requests for services, resulting in a denial of service. When the targeted device is behind a firewall, an access list protects against such attacks by explicitly restricting inbound access to the device to a select few IP addresses.

A major drawback to access lists, DoS, and SYN attack protections is that access to the network is machine- or hardware-based instead of user-based. Therefore, an unauthorized user who has access to an authorized machine can still gain access to the network, completely bypassing the intended security protection. Moreover, publicly accessed network resources, e.g. a web server not protected by a firewall, are more susceptible since access to a public resource cannot usually be restricted to certain machines or IP addresses. Finally, most of the security measures currently in place to defend against such attacks are proprietary and therefore expensive to implement.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for auto discovery of authenticator for network login are described. In the following description, numerous specific details are set forth. However, it is understood that embodiments of the invention may be practiced without these specific details. In other instances, well-known circuits, structures and techniques have not been shown in detail in order not to obscure the understanding of this description.

Various operations will be described as multiple discrete steps performed in turn in a manner that is most helpful in understanding the invention. However, the order of description should not be construed as to imply that these operations are necessarily performed in the order they are presented, or even order dependent.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It should be noted that while the description that follows addresses the method and apparatus as it applies to a Local Area Network (LAN), it is appreciated by those of ordinary skill in the art that method is generally applicable to any Transport Control Protocol/Internet Protocol (TCP/IP)-based network including, but not limited to, internetworks, Virtual Local Area Networks (VLANs), Metropolitan Area Networks (MANs), and Wide Area Networks (WANs), as well as networks organized into subnets.

Figure 1:
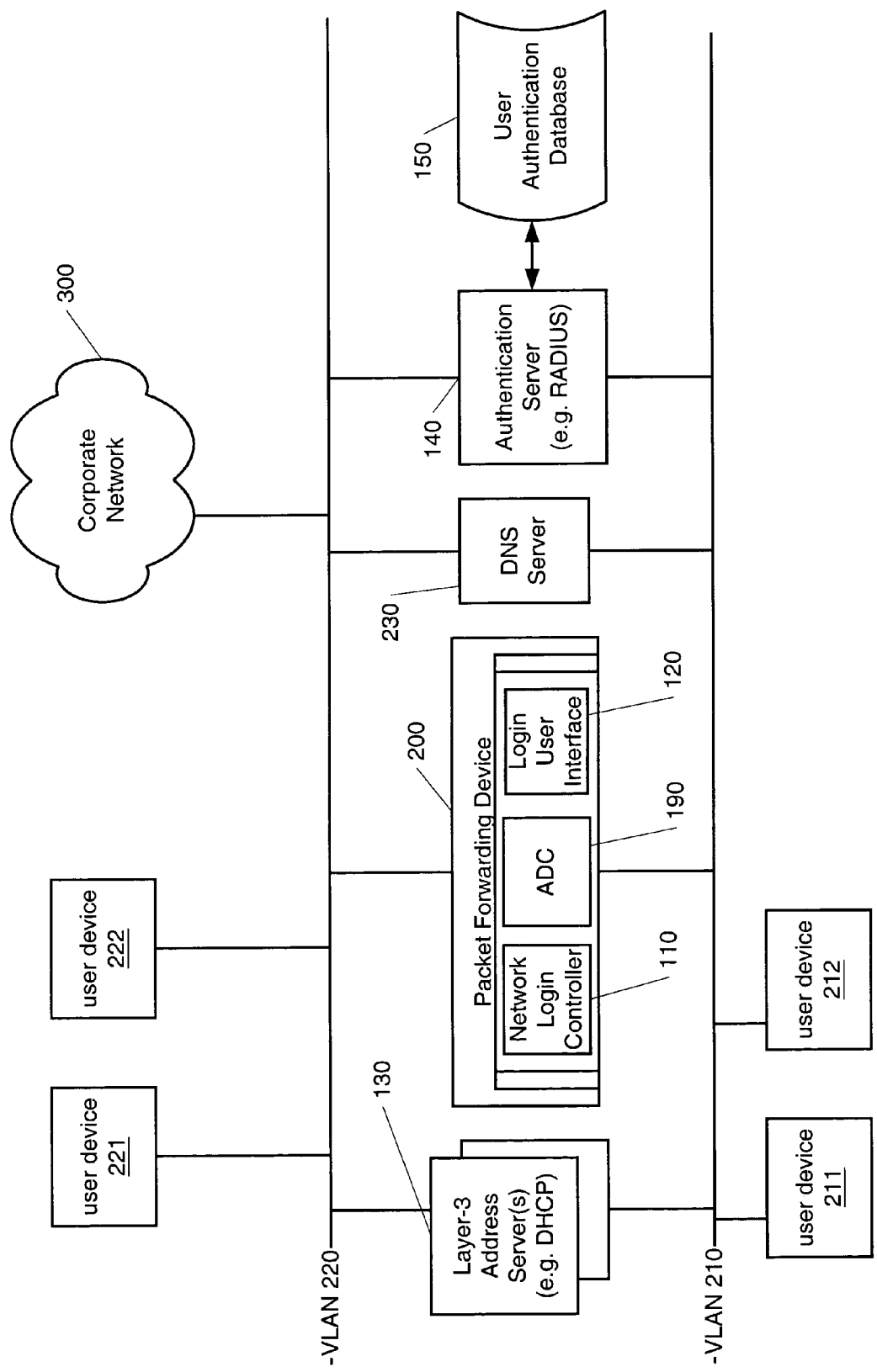
FIG. 1 is a block diagram illustrating a network configured in accordance with one embodiment of the invention.

FIG. 1 is a block diagram illustrating a network configured in accordance with one embodiment of the invention. As illustrated, the network includes virtual local area networks VLAN 210 and VLAN 220 (i.e. layer-2 domains), and a packet forwarding device 200, connecting VLAN 210 and VLAN 220 to the rest of the corporate network 300. In one embodiment, the packet forwarding device 200 may be a switch device at the edge of the network 300 that provides packet-forwarding services. In the illustrated embodiment, user devices 211 and 212 connect to packet forwarding device 200 as part of VLAN 210, and user devices 221 and 222 connect to packet forwarding device 200 as part of VLAN 220. Numerous other configurations of user devices and VLANs may be employed without departing from the scope of the invention. The user devices may be various wired or wireless devices, including but not limited to workstations, personal computers (PCs), cellular phones, or handheld devices.

In one embodiment, a user device has three states: authenticator discover, unauthenticated/unauthorized, and authenticated/authorized. In the authenticator discover state, the authenticator discovery controller (ADC) 190 handles packet exchanges. In the other two states, the network login controller 110 handles packet exchanges. In the authenticator discover state, the user device discovers the Internet Protocol (IP) address of the packet forwarding device 200. Once the IP address of the packet forwarding device is discovered, the user device may proceed with network login authorization. The network login authorization is handled by the network login controller 110 and includes authenticating the user to determine if the user should be allowed access to the network 300.

User devices 211, 212, 221, and 222, connect to network 300 using packet forwarding device 200, but are prevented from accessing network 300 until after successfully using network login authorization. The network login authorization may include a network login controller 110 which operates in conjunction with a login user interface 120 and an authentication server 140 to block packet forwarding device 200 from forwarding packets from user devices 211, 212, 221, and 222 to network 300 until the identity of the user has been authenticated using data from user authentication database 150. This results in preventing the user from accessing the entire network 300 until the network login controller 110 authorizes the user to do so.

In one embodiment, the user interface 120 comprises a web browser facility, such as the Microsoft Internet Explorer or the Netscape browsers, which is resident on the user device (e.g. 211). In one embodiment, the user interface 120 is an interface compliant with the HyperText Transfer Protocol (HTTP). The authenticator discovery controller 190 acts as a Domain Name Service (DNS) relay to permit the translation of a domain name into an IP address, intercepts a HTTP request sent to that IP address, and functions as a web server to redirect the users to a Uniform Resource Locator (URL) address of a network login page. It further resolves the DNS request from the user for the network login page by returning the packet forwarding device's IP address. In this way, the user discovers the packet forwarding device's IP address and accesses the network login page to proceed with network login authorization.

The network login authorization is handled by the network login controller 110, which functions as a web server that accepts the user identification data 121 and relays it to the authentication server 140. The network login controller 110 also serves informational data regarding the success or failure of the network login authorization as well as reports on status inquiries on the authorization state of the port and the like.

The method and apparatus for network login authorization is suitable for operating in a variety of networked environments. One environment is the "campus environment," where the typical user is a roaming user that connects to the network at various locations throughout the campus. In the campus environment, the port through which the user connects is not assigned to a permanent VLAN (i.e. layer-2 domain) until the user is authorized through the network login authorization. The other environment is the network provider (e.g. an Internet service provider) environment, where the typical user is stationary. In the network provider environment, the port and VLAN through which the user connects is constant, i.e. the port is already assigned to a permanent VLAN.

In the campus environment, the authentication server 140 is usually a RADIUS server, and the RADIUS server provides the necessary configuration details (e.g. the permanent VLAN ID to which the port will be assigned) of what will happen to the port once a successful authentication takes place. In both the campus and network provider environments, prior to authorization through network login authorization, the user obtains a temporary layer-3 address in order to gain access to the authenticator discovery controller 190, the network login controller 110, and user interface 120 on packet-forwarding device 200. In one embodiment, the network login authorization includes a layer-3 address server 130 accessible to the packet-forwarding device 200 to dynamically assign a temporary layer-3 address to the user device (e.g. 211). In an alternate embodiment, a static layer-2 address, such as the user device's Media Access Control (MAC) address may be adequate for purposes of obtaining access to the network login controller 110 and user interface 120 on packet-forwarding device 200. The temporary layer-3 address is discarded upon successful authentication through network login authorization, after which the user must obtain another layer-3 address, this time a permanent one, through an address server 130 on the permanent VLAN to which the port has been assigned (which may or may not be the same address server 130 which assigned the temporary address, as long as it is accessible on the permanent VLAN to which the port has been assigned).

Figure 2:
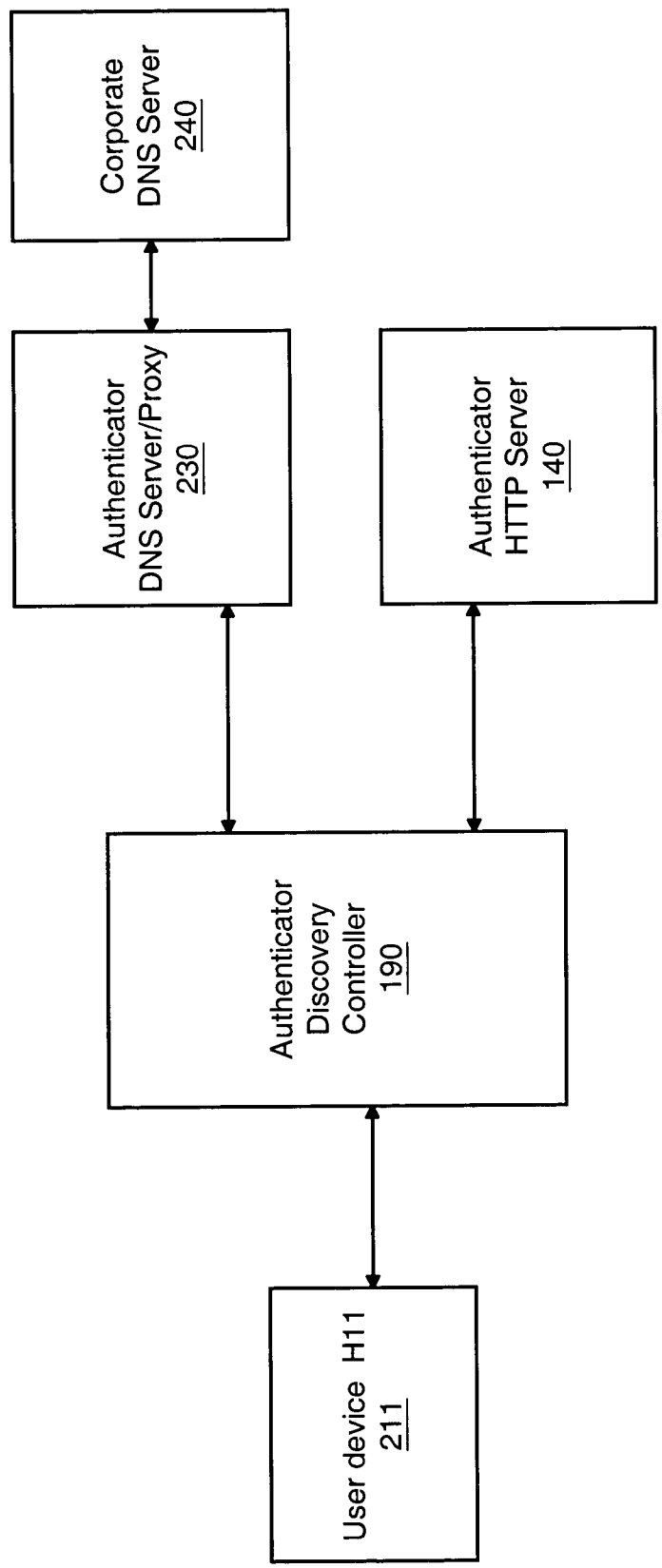
FIG. 2 is a block diagram illustrating selected components of the authenticator discovery in accordance with one embodiment of the invention.

FIG. 2 is a block diagram illustrating selected components of the authenticator discovery in accordance with one embodiment of the invention. Before a user device, e.g. 211, can proceed with network login authorization, the user device needs to know the IP address of the packet forwarding device 200. The authenticator discovery controller 190 helps the user device to discover this IP address. When the user brings up a web browser and initiates a request for a web page, the authenticator discovery controller 190 intercepts this request and directs the user to a network login page. During this process, the authenticator discovery controller 190 may first relay a DNS request by the user device to a DNS server to translate a domain name into an IP address. In one embodiment, the authenticator DNS server 230 relays the user's DNS request to a corporate DNS server 240 to resolve the domain name. Authenticator DNS server 230 will transparently proxy the DNS responses back to the user device so that to the user device, it will appear as if the DNS response is coming from a legitimate DNS server. Therefore, when the corporate DNS server 240 responds with a DNS-resolved IP address, the IP address may be forwarded to the user device in this manner. When the user device makes a HTTP request to the DNS-resolved IP address, the authenticator discovery controller 190 intercepts this HTTP request and responds with a redirect to a URL address of a network login page, e.g. http://network-accces.net/login. When the user device sends a DNS request to resolve the domain name, e.g. network-access.net, the authenticator discovery controller 190 responds with the packet forwarding device's IP address. In this way, the user device discovers the IP address of packet forwarding device 200. When the user device sends a HTTP request to the IP address of packet forwarding device 200, the authenticator discovery controller 190 responds with the network login page. The user may then proceed with the network login authorization, which includes authenticating, via the HTTP authenticator server 140, the user's identification data.

Figure 3:
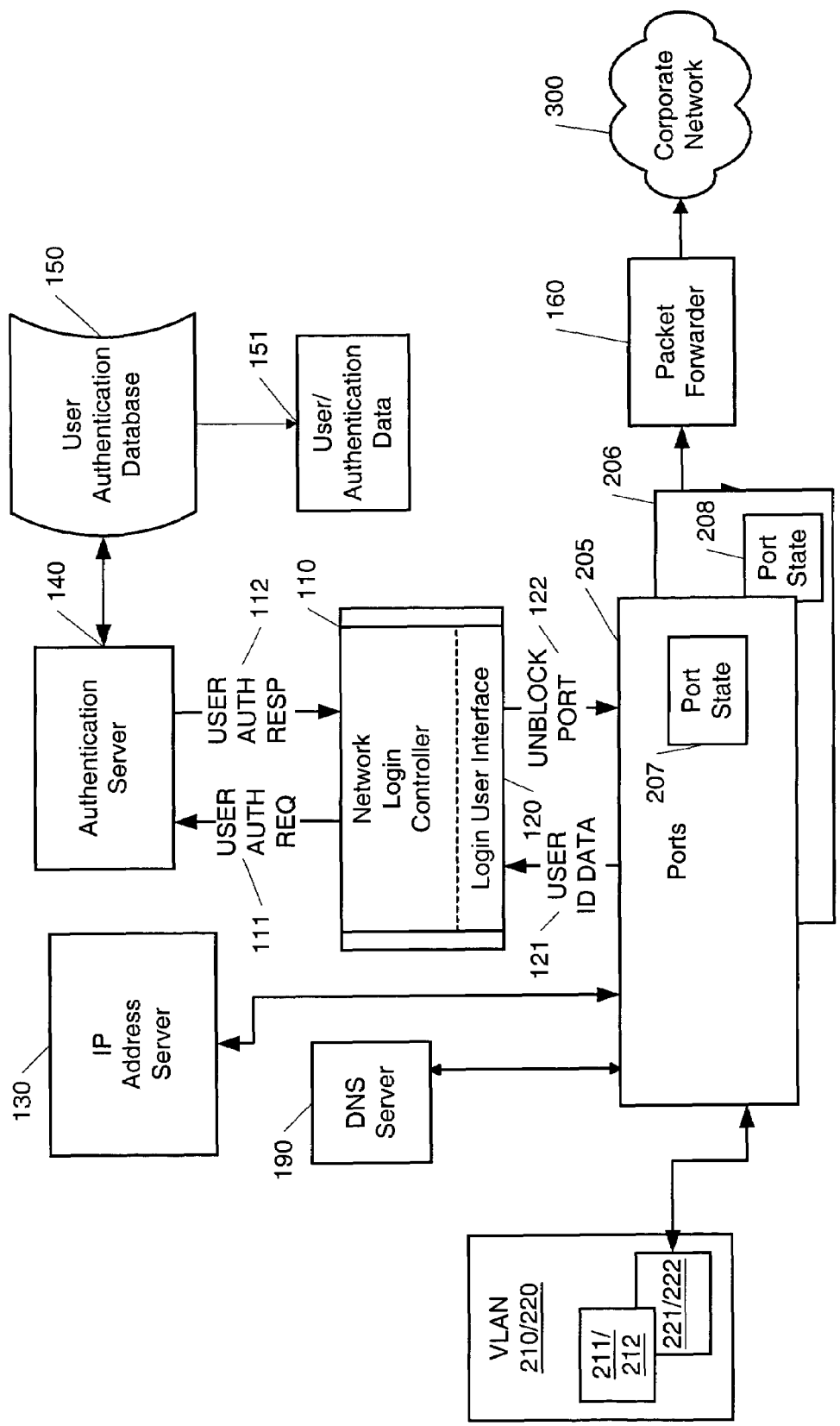
FIG. 3 is a block diagram illustrating selected components of the network login authorization in accordance with one embodiment of the invention.

FIG. 3 is a block diagram illustrating selected components of the network login authorization in accordance with one embodiment of the invention. As illustrated, the network login controller 110 operates in conjunction with the user interface 120 to obtain user identification data 121 from a user device, e.g. 211, connected through port 205. The initial default port state 207 of port 205 is unauthorized. It should be noted that not all ports on the packet-forwarding device 200 need to participate in network login authorization. Rather, the network login authorization may be implemented on a per port per VLAN (i.e. a layer-2 domain) basis. Thus, for example, the network login controller 110 may require users connecting to port 205 to be authorized using the network login authorization, but not users connecting to port 206. In that case, the initial default port state 208 of port 206 would be authorized. Similarly, the network login controller 110 may require users connecting to port 205 from user devices in VLAN 210 to be authorized using the network login authorization (where VLAN 210 is comprised, for example, of ordinary network users having restricted access to corporate network 300), but not users connecting to port 205 from VLAN 220 (where VLAN 220 is comprised, for example, of administrative network users having preferred authorization privileges in accessing the corporate network 300). Stated differently, in one embodiment network login authorization may be enabled (i.e. activated) for some ports and some VLANs on a given packet-forwarding device 200, but not others. This provides flexibility for tagged ports that belong to more than one VLAN, since network login authorization may be activated on a single tagged port for one VLAN and not the other.

Figure 4:
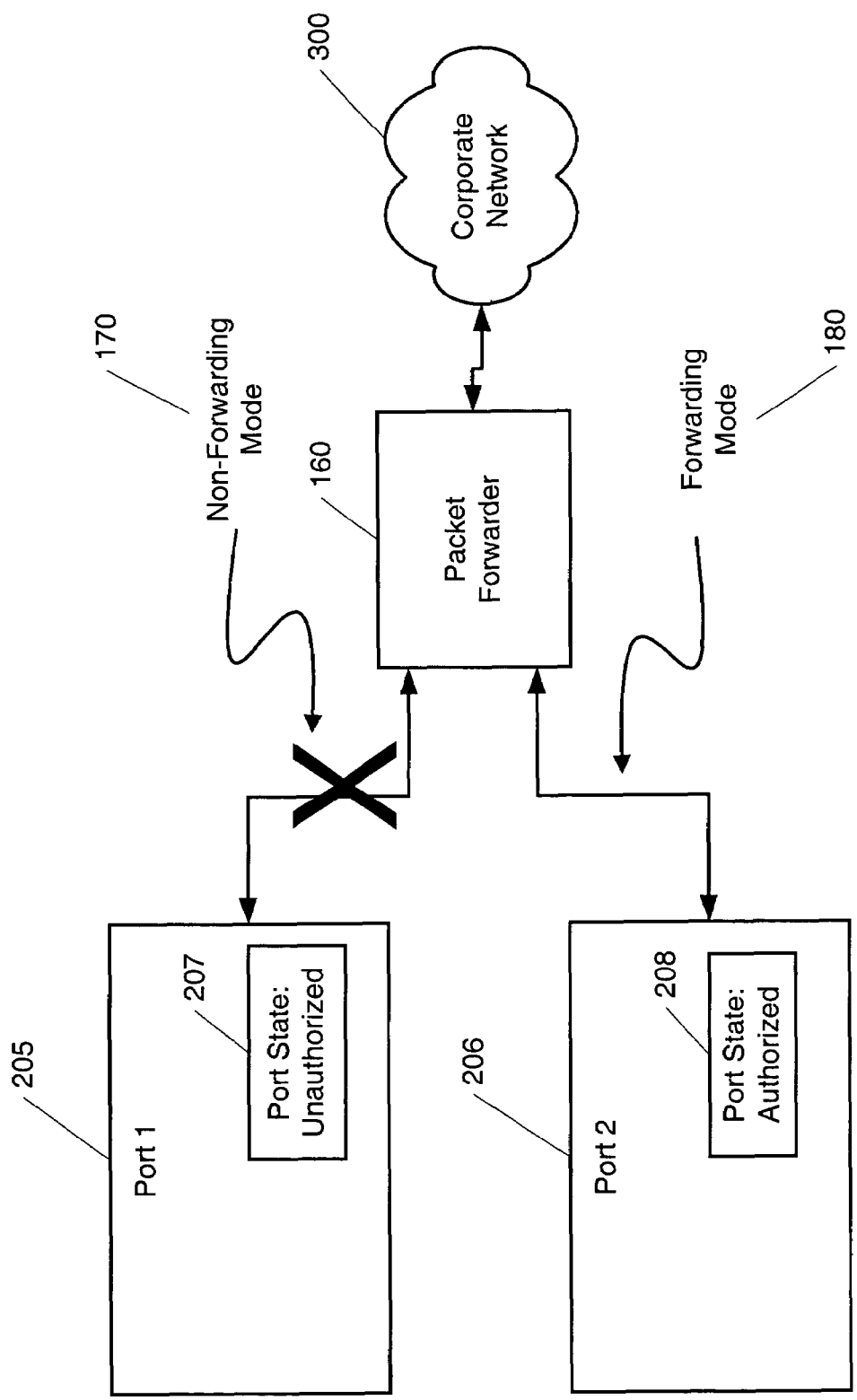
FIG. 4 is a block diagram illustrating selected components of the network login authorization of FIG. 3 in further detail in accordance with one embodiment of the invention.

FIG. 4 is a block diagram illustrating the ports 205 and 206 and their respective port statuses 207/208 in further detail in accordance with one embodiment of the invention. As shown, each port may be in a different state depending on whether or not an authorized user has connected to the port and successfully completed the network login authorization (or depending on whether network login authorization has been activated for that port or for the VLAN of the host connected to that port). In the example illustrated in FIG. 4, port 205 has a port state 207 of unauthorized. The unauthorized port state 207 of port 205 places the port 205 into a non-forwarding mode 170. Non-forwarding mode 170 causes the packet forwarder 160 to block packets to and from the port 205. Conversely, the port state 208 of port 206 is authorized, which places the port 206 into a forwarding mode 180. Forwarding mode 180 causes the packet forwarder 160 to send and receive packets to and from the port 206 as it normally would.

Returning now to FIG. 3, after the network login controller 110 obtains user identification data 121 from a user device, e.g. 211, connected through port 205 in conjunction with the user interface 120, the network login controller 110 sends a user authentication request 111 to an authentication server 140. The authentication server 140 retrieves the user authentication data 151 from a user authentication database 150, and compares it to the user identification data 121 provided in the user authentication request 111. If the data compare favorably, then the authentication server 140 returns a positive user authentication response 112 to the network login controller 110, which indicates that the user is authentic. The network login controller sends an unblock port command 122 to the port 205, which sets the port state 207 to authorized. This places the port 205 into forwarding mode 180 so that the packet forwarder 160 of packet forwarding device 200 can commence forwarding packets to and from the user connected through port 205 on user device 211 of VLAN 210.

If the data does not compare favorably, then the authentication server 140 returns a negative user authentication response 112 to the network login controller 110 which indicates that the user cannot be authenticated with the provided user identification data 121. The user interface 120 continues to prompt the user to provide more accurate user identification data 121 and port state 207 remains unauthorized. As a result, port 205 remains in non-forwarding mode 170, which prevents the packet forwarder 160 from forwarding packets for the user connected through port 205 on user device 211 of VLAN 210.

In one embodiment, the authentication server 140 is a RADIUS server, and the network login controller 110 and/or authenticator discovery controller 190 functions as a RADIUS client. In that case, the user authentication request 111 and user authentication response 112 are data packets conforming to the RADIUS communication protocol for communicating authentication data. The operation of the RADIUS server and communication protocol is known in the art and will not be further discussed except as it pertains to the method and apparatus of the invention.

In an alternate embodiment, the network login controller 110 or authenticator discovery controller 190 may use a user authentication database 150 directly instead of through an authentication server 140. In that case, the user authentication database 150 may comprise an internal database stored on the packet-forwarding device 200, and the user authentication request 111 and user authentication response 112 may be handled through internal communication.

In one embodiment, the user device 211 may need at least a temporary IP address to gain access to the authenticator discovery controller 190 or network login controller 110 and associated user interface 120 on packet-forwarding device 200. In some cases the user device, e.g. 211, uses its MAC address, while in other cases the user device uses a previously obtained IP address, such as in the case of an Internet service provider environment where the user uses the same port and VLAN for authentication each time. Sometimes, the user device needs to obtain a temporary IP address from the packet-forwarding device 200 before authenticator discovery or network login authorization can take place, such as in the case of a campus environment where a roaming user will not always be using the same port for authentication. In one embodiment, assigning a temporary IP address to user device 211 is handled by an IP address server 130. One example of an IP address server that may be used is a Dynamic Host Control Protocol (DHCP) server accessible by the packet-forwarding device 200. In an alternate embodiment, the DHCP server may be implemented in the packet-forwarding device 200 itself. The operation of the IP address server is known in the art and will not be further discussed except as it pertains to the method and apparatus of the invention.

Figure 5:
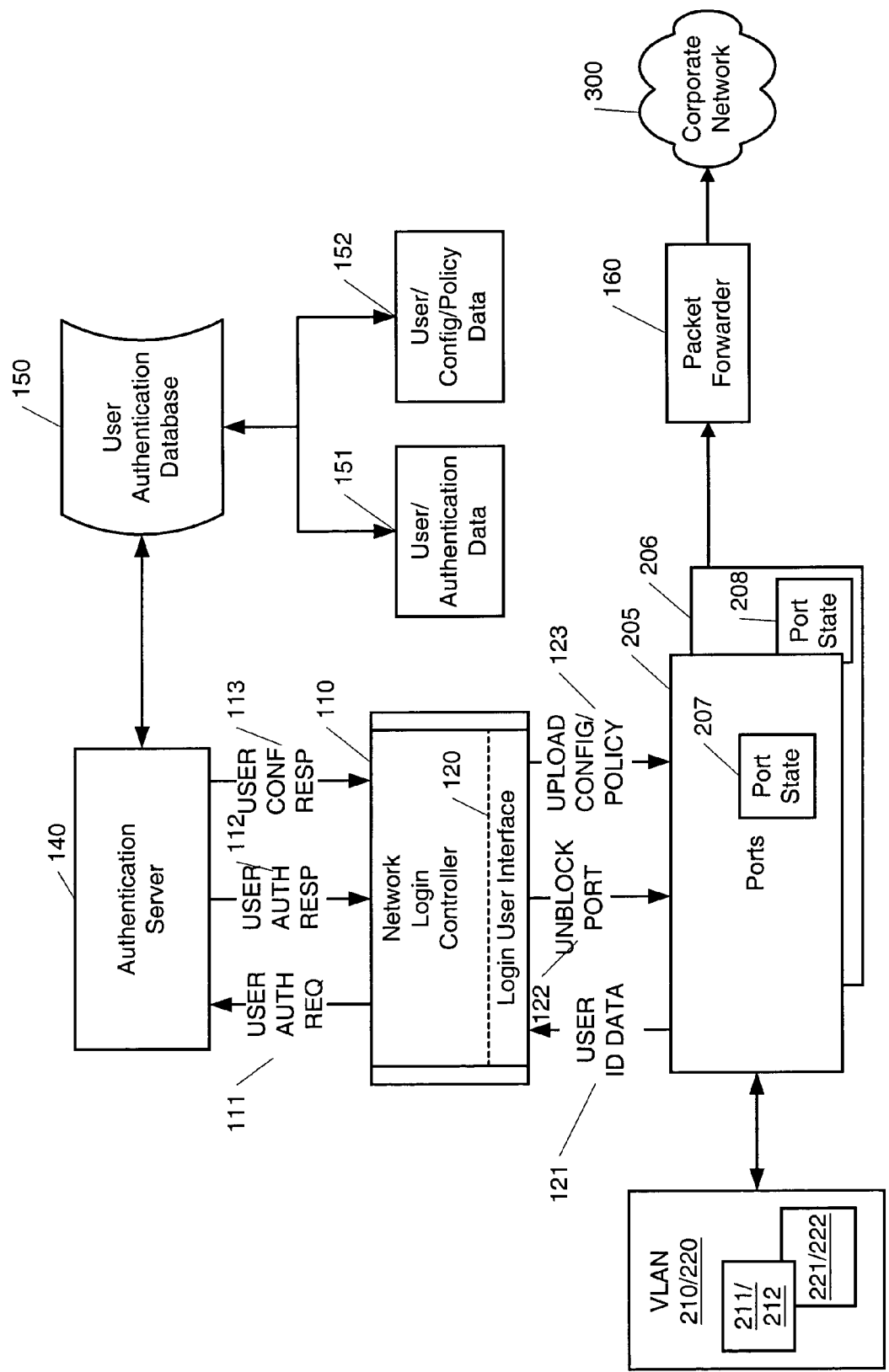
FIG. 5 is a block diagram illustrating selected components of the network login authorization of FIG. 3 in further detail in accordance with one embodiment of the invention.

FIG. 5 is a block diagram illustrating additional selected components of the network login authorization in further detail in accordance with one embodiment of the invention. In one embodiment, once the network login controller 110 sends an unblock port command 122 to the port 205, setting the port state 207 to authorized, the network login controller 110 may receive policy configuration data 152 from the authentication server 140. Specifically, the authentication server 140 retrieves a user configuration/policy data 152 from the user authentication database 150. The user configuration/policy data 152 is typically stored on a RADIUS server, but could also be stored on any network management server accessible to the packet-forwarding device 200. The configuration policy data 152 is sent in a user configuration response 113 to the network login controller 110. The network login controller 110 automatically uploads 123 the configuration and policy data 152 to the authorized port 205 without network administrator intervention. The ability to automatically upload the policy and configuration data 152 to the authorized port eliminates the need to manually store the policy and configuration data 152 on the packet-forwarding device 200 as well as the need to manually configure the port 205. The automatic configuration is especially advantageous in the campus environment, where the users are roaming users that are not assigned to a permanent port or VLAN. A port that has been dynamically configured with user-specific policy each time the user connects to the network 300 allows for greater control of network resources, as well as the ability to more accurately log user activity and network usage and, as a result, to generate more accurate billing information.

Figure 6:
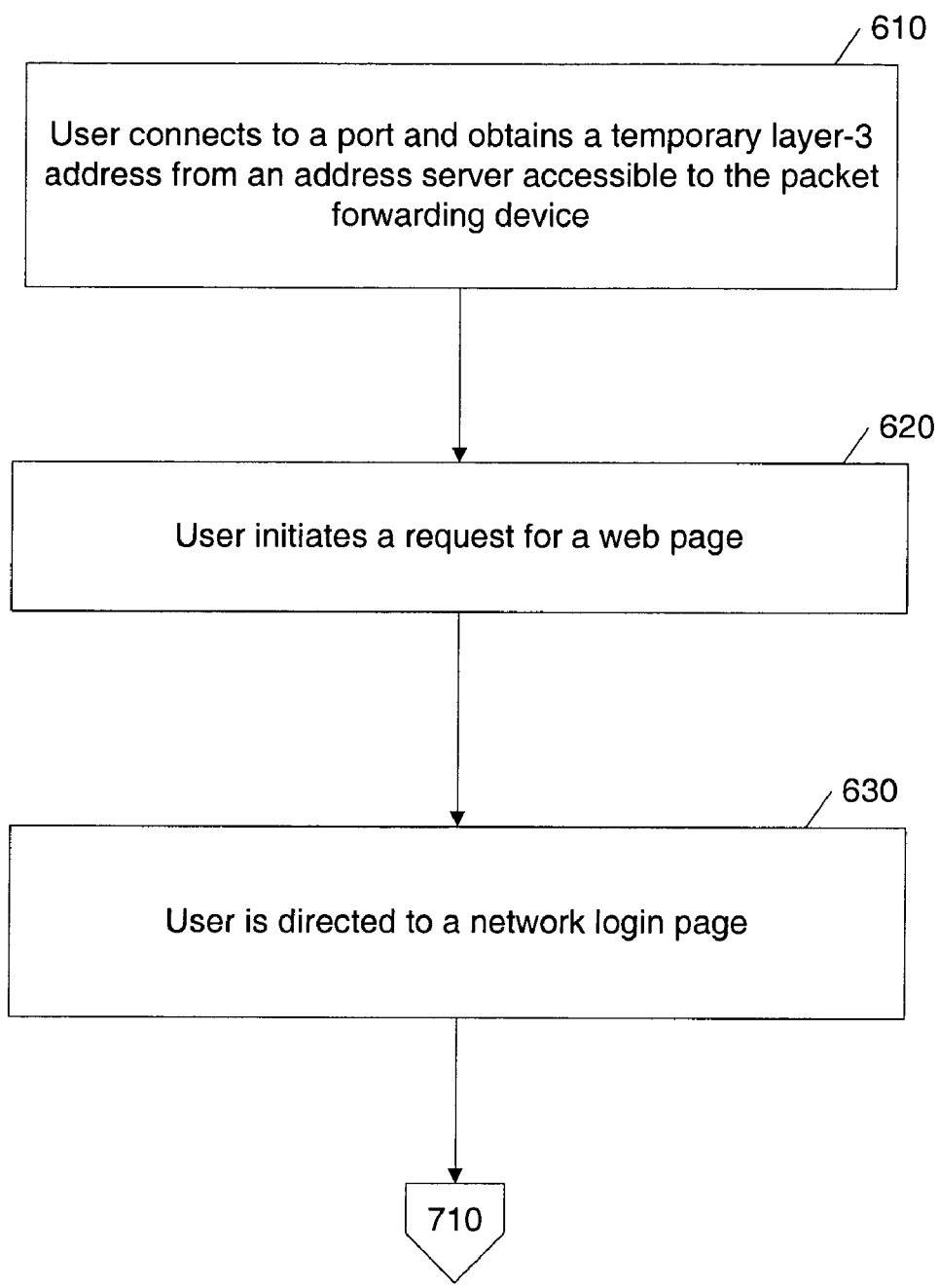
FIG. 6 is a flow diagram illustrating certain aspects of a method to be performed by a computer executing authenticator discovery according to one embodiment of the invention.
Figure 7:
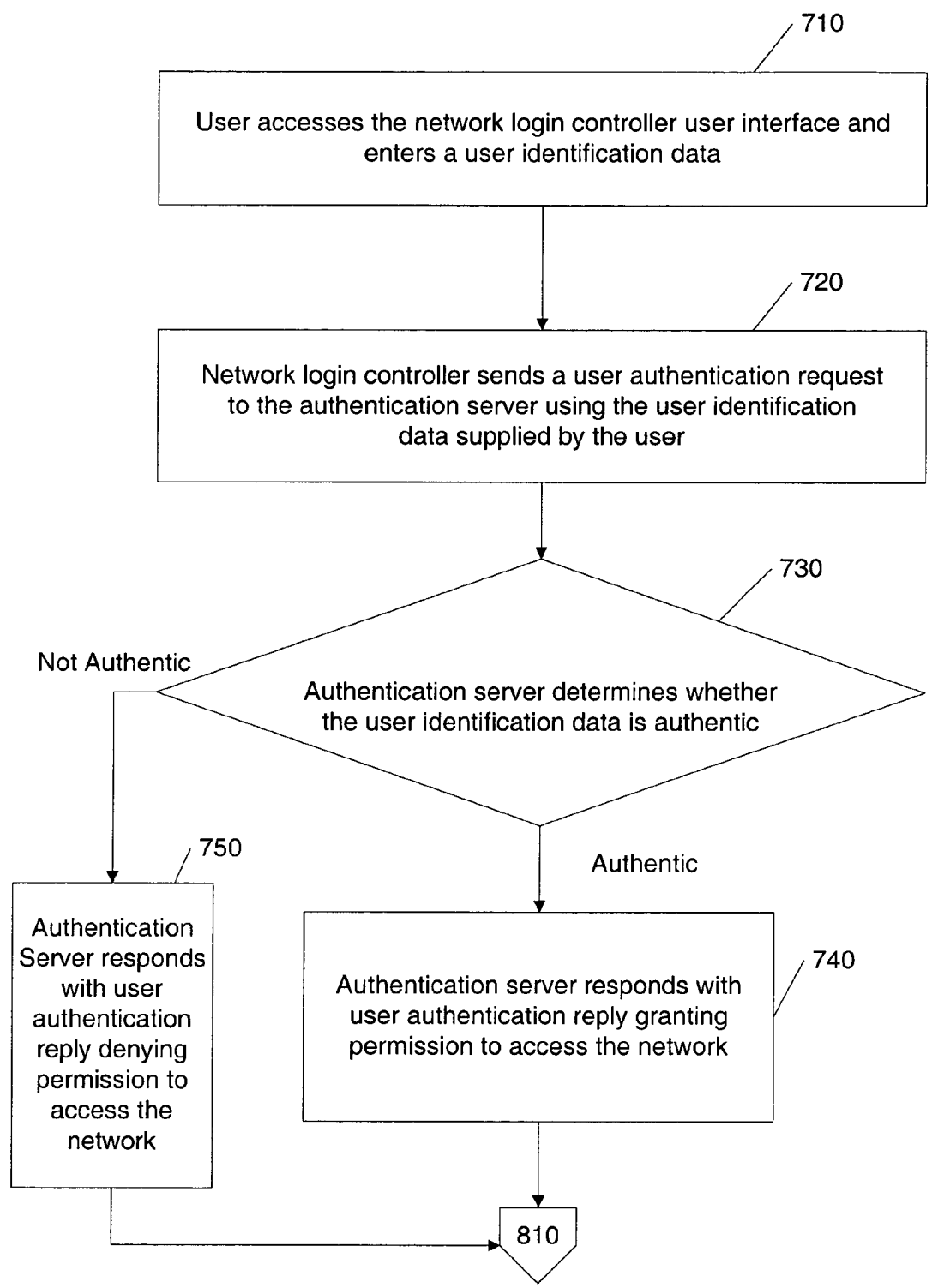
FIG. 7 is a flow diagram illustrating certain additional aspects of a method to be performed by a computer executing network login authorization according to one embodiment of the invention.
Figure 8:
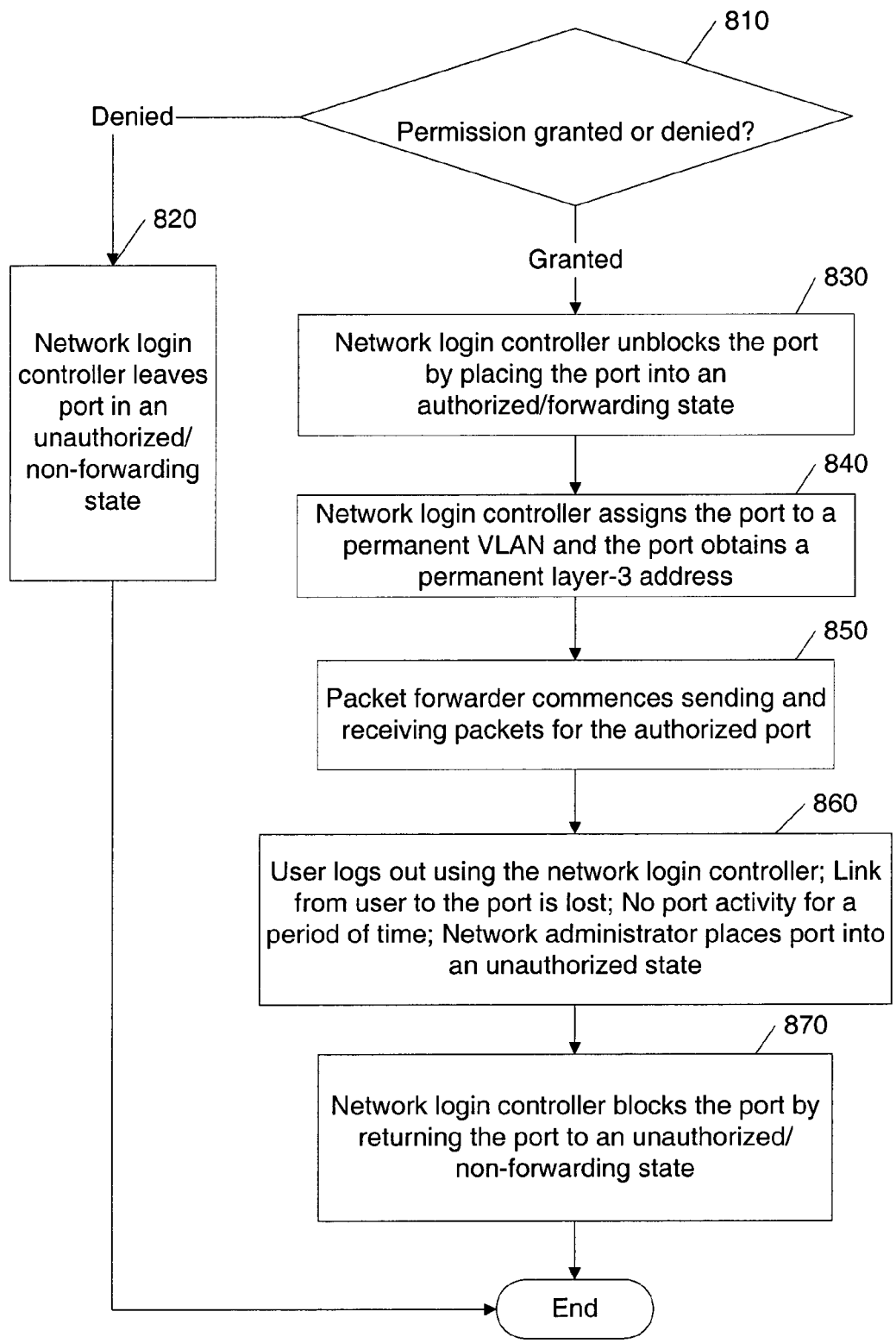
FIG. 8 is a flow diagram illustrating certain additional aspects of a method to be performed by a computer executing network login authorization according to one embodiment of the invention.

Referring to FIGS. 6-8, certain aspects of the authenticator discovery and network login authorization to control access to a network are shown. In particular, FIGS. 6-8 illustrate some of the acts to be performed by a computer executing an authenticator discovery controller 190 and a network login controller 110 on a packet-forwarding device 200 that incorporates one embodiment of the invention. The particular methods of the invention are described in terms of software with reference to a series of flowcharts. In this context, the methods to be performed by a packet-forwarding device 200 incorporating an embodiment of the invention constitute computer programs made up of computer-executable instructions. Describing the methods by reference to a flowchart enables one skilled in the art to develop such programs including such instructions to carry out the methods on suitably configured computers or devices (i.e. the processor of the computer or other device executing the instructions from computer-accessible media). The computer-executable instructions may be written in a computer programming language or may be embodied in firmware logic. If written in a programming language conforming to a recognized standard, such instructions can be executed on a variety of hardware platforms and for interface to a variety of operating systems and network operating systems. In addition, the invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by a computer causes the processor of the computer to perform an action or a produce a result.

FIG. 6 is a flow diagram illustrating certain aspects of a method to be performed by a computer executing authenticator discovery according to one embodiment of the invention. At processing block 610, a user connects to a port of a packet-forwarding device 200 from a user device, e.g. 211. In one embodiment, the user device may need to obtain a temporary IP address from an IP address server 130 accessible to packet forwarding device 200. In one embodiment, the IP address server 130 is a DHCP server that may reside on the network 300, or in the packet forwarding device 200 itself. A temporary IP address is required in the campus environment where a typical user is a roaming user that may connect to the network from any number of ports that are available at various locations on the campus.

At processing block 620, the user initiates a request for a web page. In one embodiment, the request is a HTTP request to a URL address. The request may require DNS resolution. If so, the authenticator discovery controller 190 will receive a DNS request from the user device and will proxy the DNS request to the DNS server. The DNS server responds to the request with a DNS-resolved IP address. The authenticator discovery controller 190 then forwards the DNS-resolved IP address to the user device. The user device then sends a HTTP request to the DNS-resolved IP address.

At processing block 630, authenticator discovery controller 190 responds to the user device with a redirect to a network login page. In one embodiment, the response is a URL address that requires DNS resolution. In this case, the user device will send a DNS request. The authenticator discovery controller 190 responds to the DNS request with the packet forwarding device's own IP address. In this way, the user device discovers the IP address of the packet forwarding device 200. The user device then sends a request to the IP address of the packet forwarding device. The authenticator discovery controller 190 responds with the network login page. The user may then proceed with the network login authorization.

FIG. 7 is a flow diagram illustrating certain additional aspects of a method to be performed by a computer executing network login authorization according to one embodiment of the invention. At processing block 710, the user accesses the network login controller 110 via the user interface 120 of the network login page. The user is prompted to enter user identification data 121, such as a user name and password. At processing block 720, the network login controller 110 sends a user authentication request 111 to the authentication server 140, using the user identification data 121 entered by the user. At block 730, the authentication server 140 compares the user identification data 121 entered by the user with user authentication data 151 obtained from the user authentication database 150. If the data compares favorably, then the user is authenticated, and at block 740, the authentication server 140 responds with a user authentication reply 112 granting the user permission to access the network. However, if the data does not compare favorably, then the user is not authenticated, and at block 750, the authentication server responds with a user authentication reply 112 denying the user permission to access the network.

Referring to FIG. 8, at processing block 810, the network login controller 110 determines from the user authentication reply 112 whether the user has been granted or denied permission to access the network. If the user has been denied permission to access the network, then processing continues at block 820, where the network login controller 110 leaves the port in an unauthorized state, or if necessary, unblocks the port to which the user is connected by placing it into an unauthorized state. If the user has been granted permission to access the network, then processing continues at block 830, where the network login controller 110 unblocks the port to which the user connected by placing it into an authorized state. Then, at processing block 840, the network login controller 110 assigns the port to a permanent VLAN using port configuration data that has been obtained from the authentication server 140 and authentication database 150, or from some other network management server accessible to the packet-forwarding device, or even from configuration data stored in the packet forwarding device itself. In one embodiment, such as in the campus environment, the permanent port configuration is obtained from a RADIUS server. Once the port has been assigned to a permanent VLAN, the port obtains a permanent layer-3 address using an address server 130 that is accessible on the permanent VLAN. In one embodiment, the permanent layer-3 address is obtained from a DHCP server that resides on the permanent VLAN to which the port has been assigned. In one embodiment, the authentication server 140 responds further with user policy configuration data 152 obtained from the user authentication database 150 for downloading to the network login controller 110. Then, the network login controller 110 uploads the port configuration in accordance with the user policy configuration data 152 provided by the authentication server 140.

At processing block 850, the packet forwarder recognizes that the port is in a forwarding mode, and commences sending and receiving packets for the authorized port and port user. The packet forwarding services provided by the packet forwarder continue until, at processing block 860, the network login controller 110 resets the port back into a unauthorized state or non-forwarding mode. In one embodiment, the resetting is performed when a user successfully logs off the packet forwarding device 200 from the user interface 120, when a connection from the user to the port is disconnected, when no activity from the user occurs on the port for a duration of time, or when an administrator forces the port to change its state. The resetting is completed at block 870, where the network login controller 110, if necessary, blocks the port by placing it into an unauthorized state.

Embodiments of the invention may be represented as a software product stored on a machine-accessible medium (also referred to as a computer-readable medium or a processor-readable medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. As an example, the procedures described herein for authenticator discovery controller 190, network login controller 110, the user interface 120, the address server 130, DNS server 230, and the authentication server 140, and the associated protocols can be stored on the machine-accessible medium. In addition, the data for the authentication server 140 and associated authentication database 150, or the address server 130 and associated data may be stored in an internal storage area or on an external storage medium that is machine-accessible. Those of ordinary skill in the art will appreciate that other instructions and operations necessary to implement the described invention may also be stored on the machine-accessible medium.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method of autodiscovery of an authenticator and packet forwarding device for network login, the method comprising:

receiving a connection request from an unauthorized user device at the packet forwarding device, the unauthorized user device requesting access to a network interfaced to the packet forwarding device;

blocking all packets received from the unauthorized user device at the packet forwarding device from accessing the network;

intercepting and redirecting a network login page of a user request to access the network by an authenticator discovery controller and returning the packet forwarding device's IP address;

assigning a temporary layer-3 address or a static layer-2 address to the unauthorized user device to gain access to the authenticator discovery controller, the network login controller, and user interface on the packet-forwarding device;

proceeding with the network login authentication and authorization using the network login controller upon receiving the packet forwarding device's IP address from the authenticator discovery controller and using the temporary layer-3 address or the static layer-2 address assigned to the user device;

accessing the network login controller user interface and entering a user identification data;

determining whether the user identification data is authentic by the authentication server;

if the user has been denied permission to access the network by the authentication server;
  the network login controller blocks the port to which the user is connected and leaves the port in an unauthorized state and the packet forwarding device in a non-forwarding mode;

if the user has been granted permission to access the network by the authentication server:
  the network login controller unblocks the port to which the user connected by placing the port of the packet forwarding device into an authorized state and assigning the port to a permanent VLAN, and
  replaces the temporary layer-3 address assigned to the user device with a permanent layer-3 address; and resetting the port back into an unauthorized state and blocking the port, wherein the resetting is performed when at least one of the following occurs:
  when a user successfully logs off the packet forwarding device,
  when a connection from the user to the port is disconnected,
  when no activity from the user occurs on the port for a duration of time, and
  when an administrator forces the port to change its state.

2. The method of claim 1, wherein intercepting and redirecting the network login page comprises: intercepting the user request to access the network and redirecting to a web page comprising the network login page.

3. The method of claim 1, wherein the user has been granted permission to access the network by the authentication server comprises the authentication server authenticating the user based on at least a user name and a password received from the unauthorized computing device.

4. The method of claim 1, wherein accessing the network login controller user interface and entering the user identification data comprises the authenticator directing the unauthorized computing device to a Uniform Resource Locator (URL) address through which to access the user interface at a network login page.

5. The method of claim 1, wherein determining whether the user identification data is authentic by the authentication server comprises:

sending the user identification data to the authentication server; and receiving an indication from the authentication server that the user identification data is authentic and that the user associated with the user identification data is authorized to access the network.

6. The method of claim 5, wherein sending the user identification data to the authentication server comprises:

creating a packet comprising the user identification data in accordance with a Remote Authentication Dial-In User Service (RADIUS) communications protocol; and forwarding the packet to a RADIUS server for authentication.

7. The method of claim 1, wherein the authenticator and packet forwarding device comprises a network switching device located at an edge of the network to provide packet-forwarding services into the network.

8. A computer-readable storage medium having instructions stored thereon that, when executed by a processor in an authenticator and packet forwarding device, the instructions cause the processor to perform an autodiscovery method comprising:

receiving a connection request from an unauthorized user device at the packet forwarding device, the unauthorized user device requesting access to a network interfaced to the packet forwarding device;

blocking all packets received from the unauthorized user device at the packet forwarding device from accessing the network;

intercepting and redirecting a network login page of a user request to access the network by an authenticator discovery controller and returning the packet forwarding device's IP address;

assigning a temporary layer-3 address or a static layer-2 address to the unauthorized user device to gain access to the authenticator discovery controller, the network login controller, and user interface on the packet-forwarding device;

proceeding with the network login authentication and authorization using the network login controller upon receiving the packet forwarding device's IP address from the authenticator discovery controller and using the temporary layer-3 address or the static layer-2 address assigned to the user device;

accessing the network login controller user interface and entering a user identification data;

determining whether the user identification data is authentic by the authentication server;

if the user has been denied permission to access the network by the authentication server;
  the network login controller blocks the port to which the user is connected and leaves the port in an unauthorized state and the packet forwarding device in a non-forwarding mode;

if the user has been granted permission to access the network by the authentication server:
  the network login controller unblocks the port to which the user connected by placing the port of the packet forwarding device into an authorized state and assigning the port to a permanent VLAN, and
  replaces the temporary layer-3 address assigned to the user device with a permanent layer-3 address; and resetting the port back into an unauthorized state and blocking the port, wherein the resetting is performed when at least one of the following occurs:
  when a user successfully logs off the packet forwarding device, when a connection from the user to the port is disconnected, when no activity from the user occurs on the port for a duration of time, and when an administrator forces the port to change its state.

9. The computer-readable storage medium of claim 8, wherein intercepting and redirecting the network login page comprises: intercepting the user request to access the network and redirecting to a web page comprising the network login page.

10. The computer-readable storage medium of claim 8, wherein the user has been granted permission to access the network by the authentication server comprises the authentication server authenticating the user based on at least a user name and a password received from the unauthorized computing device.

11. The computer-readable storage medium of claim 8, wherein accessing the network login controller user interface and entering the user identification data comprises the authenticator directing the unauthorized computing device to a Uniform Resource Locator (URL) address through which to access the user interface at a network login page.

12. The computer-readable storage medium of claim 8, wherein determining whether the user identification data is authentic by the authentication server comprises:

sending the user identification data to the authentication server; and receiving an indication from the authentication server that the user identification data is authentic and that the user associated with the user identification data is authorized to access the network.

13. The computer-readable storage medium of claim 12, wherein sending the user identification data to the authentication server comprises:

creating a packet comprising the user identification data in accordance with a Remote Authentication Dial-In User Service (RADIUS) communications protocol; and forwarding the packet to a RADIUS server for authentication.

14. The computer-readable storage medium of claim 8, wherein the authenticator and packet forwarding device comprises a network switching device located at an edge of the network to provide packet-forwarding services into the network.

* * * * *